(12) United States Patent
Chen et al.

(10) Patent No.: US 12,164,023 B2
(45) Date of Patent: *Dec. 10, 2024

(54) SECURITY INSPECTION APPARATUS AND METHOD OF CONTROLLING THE SAME

(71) Applicants: Tsinghua University, Beijing (CN); Nuctech Company Limited, Beijing (CN)

(72) Inventors: Zhiqiang Chen, Beijing (CN); Yan You, Beijing (CN); Ziran Zhao, Beijing (CN); Xuming Ma, Beijing (CN); Kai Wang, Beijing (CN)

(73) Assignees: Tsinghua University, Beijing (CN); Nuctech Company Limited, Beijing (CN)

( * ) Notice: Subject to any disclaimer, the term of this patent is extended or adjusted under 35 U.S.C. 154(b) by 519 days.

This patent is subject to a terminal disclaimer.

(21) Appl. No.: 17/304,927

(22) Filed: Jun. 28, 2021

(65) Prior Publication Data

US 2021/0325528 A1    Oct. 21, 2021

Related U.S. Application Data

(63) Continuation of application No. PCT/CN2019/110380, filed on Oct. 10, 2019.

(30) Foreign Application Priority Data

Dec. 29, 2018 (CN) .......................... 201811653597.4

(51) Int. Cl.
*G01S 13/88* (2006.01)
*G01S 13/89* (2006.01)

(52) U.S. Cl.
CPC ............ *G01S 13/887* (2013.01); *G01S 13/89* (2013.01)

(58) Field of Classification Search
CPC ...... G01S 13/887; G01S 13/89; H01Q 1/2258
See application file for complete search history.

(56) References Cited

U.S. PATENT DOCUMENTS

2007/0263907 A1* 11/2007 McMakin .............. G06V 40/25
                                                                382/107
2011/0163876 A1    7/2011 Uemura et al.
(Continued)

FOREIGN PATENT DOCUMENTS

CN      102077118 A     5/2011
CN      103616667 A     3/2014
(Continued)

OTHER PUBLICATIONS

Office Action Issued for Japanese Application No. 2021-538342 dated Jun. 20, 2022, in 3 pages.
(Continued)

*Primary Examiner* — Ladimir Magloire
*Assistant Examiner* — Noah Yi Min Zhu
(74) *Attorney, Agent, or Firm* — Knobbe, Martens, Olson & Bear, LLP

(57) ABSTRACT

A security inspection apparatus and a method of controlling the same are described. An example security inspection apparatus includes a bottom plate configured to carry an inspected object and a two-dimensional multi-input multi-output array panel, including at least one two-dimensional multi-input multi-output sub-array. Each two-dimensional multi-input multi-output sub-array includes transmitting antennas and receiving antennas arranged such that equivalent phase centers are arranged in a two-dimensional array. The security inspection apparatus includes a control circuit configured to control the transmitting antennas to transmit a detection signal in a form of an electromagnetic wave to the inspected object in a preset order, and to control the receiving antennas to receive an echo signal from the inspected (Continued)

object. The security inspection apparatus includes a signal processing device configured to reconstruct an image of an inspected object based on an echo signal received and a display device configured to display the reconstructed image.

14 Claims, 9 Drawing Sheets

(56) References Cited

U.S. PATENT DOCUMENTS

| | | | | |
|---|---|---|---|---|
| 2011/0227777 | A1* | 9/2011 | Lee | H01Q 3/08 |
| | | | | 342/374 |
| 2014/0091965 | A1* | 4/2014 | Sheen | G01S 13/90 |
| | | | | 342/25 A |
| 2014/0320331 | A1* | 10/2014 | Fernandes | G01S 13/887 |
| | | | | 342/22 |
| 2017/0227636 | A1 | 8/2017 | Moulder et al. | |
| 2017/0343666 | A1* | 11/2017 | Manneschi | G01V 3/12 |
| 2019/0339380 | A1* | 11/2019 | Marks | G01S 13/887 |

FOREIGN PATENT DOCUMENTS

| | | |
|---|---|---|
| CN | 104808201 A | 7/2015 |
| CN | 105974486 A | 9/2016 |
| CN | 106093898 A | 11/2016 |
| CN | 107219527 A | 9/2017 |
| CN | 107300724 A | 10/2017 |
| CN | 109031284 A | 12/2018 |
| CN | 109444968 A | 3/2019 |
| CN | 209342935 U | 9/2019 |
| JP | 2010-008274 A | 1/2010 |
| JP | 2018-100972 A | 6/2018 |
| JP | 2018-537679 A | 12/2018 |

OTHER PUBLICATIONS

International Search Report with Translation for International Application No. PCT/CN2019/110380 dated Jan. 6, 2020 in 4 pages.
Chinese Office Action (First) mailed May 12, 2023 in Chinese Application No. 201811653597.4, in 8 pages.
European Search Report, Extended, mailed Aug. 17, 2022 in European Application No. 19902194.0, 14 pages.
Korean Office Action mailed Jul. 17, 2023, in Korean Application No. 2023-064552441, in 7 pages.

* cited by examiner

SECURITY INSPECTION APPARATUS AND METHOD OF CONTROLLING THE SAME

CROSS REFERENCE TO RELATED APPLICATIONS

This application is a continuation of, and claims priority to, International Application No. PCT/CN2019/110380, which claims priority to Chinese patent Application No. CN201811653597.4, filed on Dec. 29, 2018, the contents of each of the above-recited applications are hereby incorporated herein by reference in their entirety.

TECHNICAL FIELD

The disclosed technology relates to security inspection, and in particular to a security inspection apparatus and a method of controlling the same.

BACKGROUND

Security measures in airports, railway stations, hotels, campuses, banks and other special places may not meet ever-increasing security needs. Concealing dangerous goods such as drugs and explosives in shoe soles is currently a common way of committing crimes. For this, security inspection methods commonly used include a metal detector security inspection, a manual security inspection and an X-ray security inspection. However, a metal detector may only detect metals and may not detect non-metallic substances such as drugs and explosives. The manual security inspection often requires a cooperation of an inspected object, such as taking off shoes or maintaining a specific posture. On the one hand, it causes inconvenience to both the inspected object and a security inspector. On the other hand, a speed and an accuracy of the security inspection are poor. The X-ray security inspection has ionizing radiation, which affects human health.

SUMMARY

According to one aspect of the disclosed technology, there is provided a security inspection apparatus, including:
  a bottom plate configured to carry an inspected object;
  a two-dimensional multiple-input multiple-output array panel arranged on the bottom plate and parallel to the bottom plate, including:
   at least one two-dimensional multiple-input multiple-output sub-array, wherein each two-dimensional multiple-input multiple-output sub-array includes a plurality of transmitting antennas and a plurality of receiving antennas, a midpoint of a connection line between each transmitting antenna of the plurality of transmitting antennas and a corresponding receiving antenna of the plurality of receiving antennas serves as an equivalent phase center, and the plurality of transmitting antennas and the plurality of receiving antennas are arranged such that the equivalent phase centers are arranged in a two-dimensional array; and
  a control circuit configured to control the plurality of transmitting antennas to transmit a detection signal in a form of an electromagnetic wave to an inspected object in a preset order, and to control the plurality of receiving antennas to receive an echo signal from the inspected object;
  a signal processing device connected to the two-dimensional multiple-input multiple-output array panel and configured to reconstruct an image of the inspected object according to the echo signal received; and
  a display device connected to the signal processing device and configured to display the reconstructed image of the inspected object.

Preferably, the security inspection apparatus further includes at least one side plate perpendicular to the bottom plate, and each side plate is provided with at least one two-dimensional multiple-input multiple-output array panel.

Preferably, the at least one side plate includes a first side plate, a second side plate and a third side plate, a first detection space is formed between the first side plate and the second side plate, and a second detection space is formed between the second side plate and the third side plate.

Preferably, the two-dimensional multiple-input multiple-output array panel is installed inside or below the bottom plate.

Preferably, a distance between adjacent transmitting antennas and/or a distance between adjacent receiving antennas in each two-dimensional multiple-input multiple-output sub-array is an integer multiple of a wavelength corresponding to one of a plurality of frequencies of the detection signal, and a distance between adjacent equivalent phase centers is half of the wavelength of the detection signal.

Preferably, the two-dimensional multiple-input multiple-output sub-array includes two rows of transmitting antennas arranged in a first direction and two columns of receiving antennas arranged in a second direction perpendicular to the first direction, and the two rows of transmitting antennas and the two columns of receiving antennas form a rectangular pattern; or
  the two-dimensional multiple-input multiple-output sub-array includes a row of transmitting antennas arranged in a first direction and a column of receiving antennas arranged in a second direction perpendicular to the first direction, and the row of transmitting antennas and the column of receiving antennas intersect to form a cross shape.

Preferably, the control circuit is configured to control the plurality of transmitting antennas in each two-dimensional multiple-input multiple-output sub-array to sequentially transmit the detection signal, and control the plurality of receiving antennas in the two-dimensional multiple-input multiple-output sub-array to receive the echo signal; or the control circuit is configured to control all the transmitting antennas in the two-dimensional multiple-input multiple-output array panel to sequentially transmit the detection signal, and control all the receiving antennas in the two-dimensional multiple-input multiple-output array panel to receive the echo signal.

Preferably, the security inspection apparatus further includes a translation device configured to translate the two-dimensional multiple-input multiple-output array panel in a plane where the two-dimensional multiple-input multiple-output array panel is located.

Preferably, the security inspection apparatus further includes an alarm device connected to the signal processing device, wherein the signal processing device is further configured to: determine whether the inspected object contains a dangerous article, based on a preset standard according to the reconstructed image of the inspected object, and control the alarm device to give an alarm if the inspected object contains the dangerous article.

Preferably, the detection signal is a microwave millimeter wave with a frequency in a range of 10 GHz~300 GHz.

Preferably, the two-dimensional multi-input multi-output array panel has a length ranging from 10 cm to 50 cm and a width ranging from 10 cm to 50 cm.

According to another aspect of the disclosed technology, there is provided a method of controlling the security inspection apparatus described above, including: using the two-dimensional multi-input multi-output array panel to transmit a detection signal to an inspected object and receive an echo signal from the inspected object; and reconstructing an image of the inspected object based on the echo signal received.

Preferably, the reconstructing an image of the inspected object includes reconstructing the image of the inspected object based on a holographic reconstruction algorithm or a backward projection algorithm.

The embodiments of the disclosed technology uses the 2D MIMO array panel to perform an automatic security inspection on a part of the inspected object (for example, a foot of a human body) carried on the bottom plate through electromagnetic wave scanning. On the one hand, detection accuracy is high, and on the other hand, the inspected object is not required to take off shoes. In this way, a speed of the security inspection is increased, and a user experience is improved.

BRIEF DESCRIPTION OF THE DRAWINGS

FIG. 1b shows a schematic circuit diagram of the security inspection apparatus in FIG. 1a.

FIG. 2b shows a schematic circuit diagram of the security inspection apparatus in FIG. 2a.

FIG. 3b shows a schematic diagram of equivalent phase centers of the 2D MIMO antenna array of FIG. 3a.

FIG. 8b shows a schematic diagram of equivalent phase centers of the 2D MIMO antenna array of FIG. 8a.

FIG. 9b shows a schematic diagram of equivalent phase centers of the 2D MIMO antenna array of FIG. 9a.

DETAILED DESCRIPTION OF EMBODIMENTS

Figure 1A:
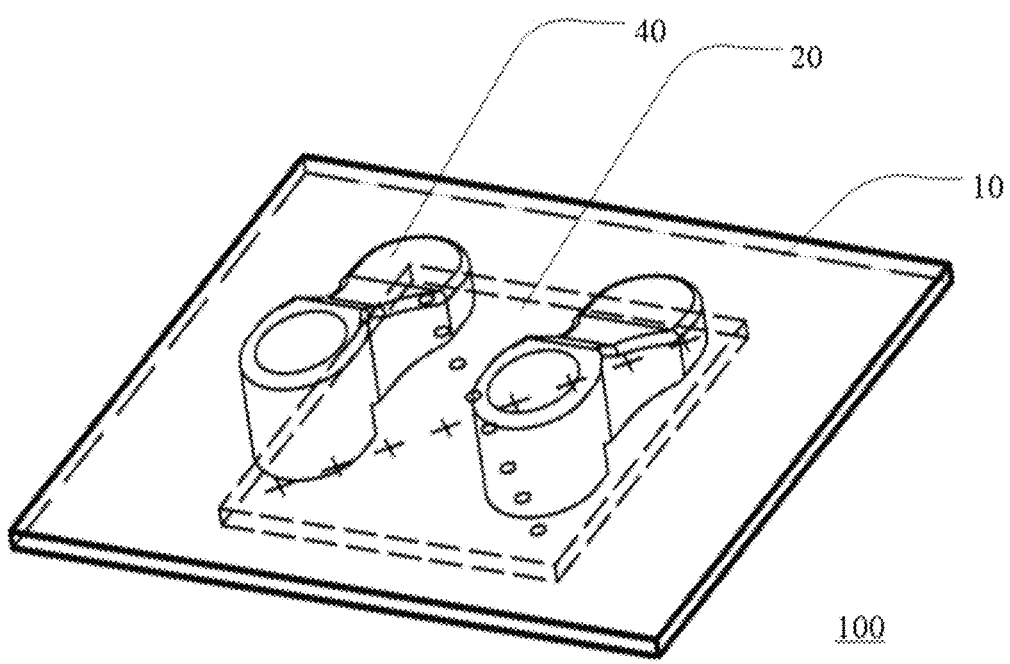
FIG. 1a shows a schematic structural diagram of a security inspection apparatus according to an embodiment of the disclosed technology.

Although the disclosed technology allows various modifications and substitutions, its specific embodiments are shown in the drawings by way of example and will be described in detail herein. However, it should be understood that the drawings and detailed description are not intended to limit the disclosed technology to the specific forms disclosed, but on the contrary, they are intended to cover all modifications, equivalents and substitutions falling within the spirit and scope of the disclosed technology defined by the appended claims. The drawings are for illustration and are not drawn to scale.

The terms "upper", "lower", "left", "right" and the like are used in the specification not to limit the absolute orientation of the element, but to describe the relative position of the element in the view to help understanding. In the specification, "top side" and "bottom side" refer to the orientation of the upper side and the lower side of an upright object in general. "First" and "second" are not for ordering, but for distinguishing different components.

A number of embodiments according to the disclosed technology will be described below with reference to the drawings.

Figure 1B:
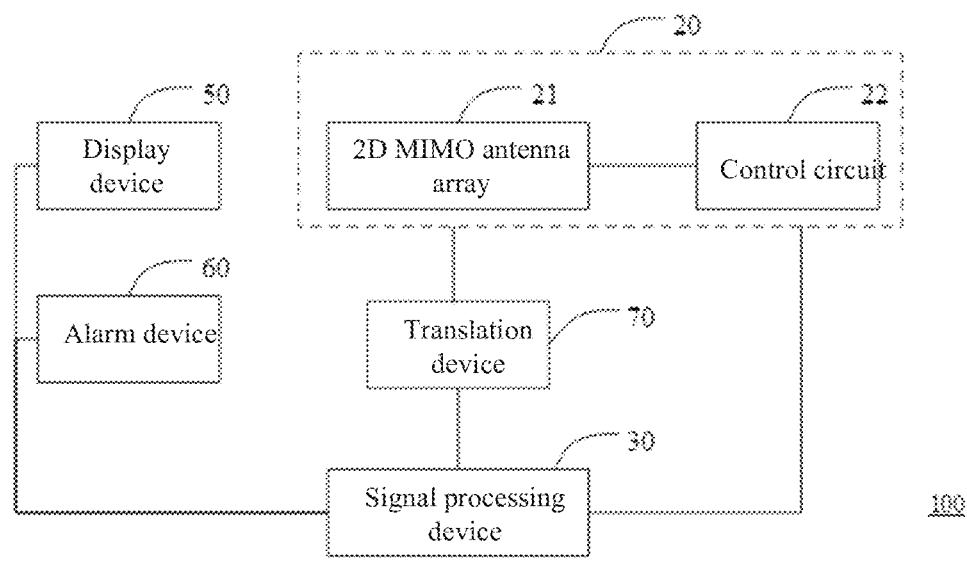

FIG. 1a shows a schematic structural diagram of a security inspection apparatus according to an embodiment of the disclosed technology. FIG. 1b shows a schematic circuit diagram of the security inspection apparatus in FIG. 1a. As shown in FIG. 1a and FIG. 1b (collectively referred to as FIG. 1), a security inspection apparatus 100 includes a bottom plate 10, a two-dimensional multiple-input multiple-output array panel 20, and a signal processing device 30.

The bottom plate is used to carry an inspected object 40. In an example shown in FIG. 1a, the inspected object 40 is human feet. The bottom plate 10 may be made of various materials suitable for electromagnetic wave penetration, including but not limited to wood, rubber, glass, and so on.

The two-dimensional multiple-input multiple-output (2D MIMO) array panel 20 is arranged on the bottom plate 10 and parallel to the bottom plate 10. As shown in FIG. 1a, the 2D MIMO antenna array 20 is installed inside the bottom plate 10 and has a size set to match that of the inspected object, for example, to match a size of the human feet.

The 2D MIMO array panel 20 includes a 2D MIMO antenna array 21 and a control circuit 22. The 2D MIMO antenna array 21 may include at least one 2D MIMO sub-array, each including a plurality of transmitting antennas and a plurality of receiving antennas. A midpoint of a connection line between each transmitting antenna of the plurality of transmitting antennas and a corresponding receiving antenna of the plurality of receiving antennas serves as an equivalent phase center. The plurality of transmitting antennas and the plurality of receiving antennas are arranged such that the equivalent phase centers are arranged in a two-dimensional array. The control circuit 22 may control the plurality of transmitting antennas in the 2D MIMO antenna array 21 to transmit a detection signal in a form of an electromagnetic wave to an inspected object in a preset order, and control a plurality of receiving antennas to receive an echo signal from the inspected object. In some embodiments, the 2D MIMO array panel 20 may be implemented by a 10 GHz~40 GHz chip, which has advantages of high degree of array integration and low cost.

The signal processing device 30 is connected to the 2D MIMO array panel 20 and may reconstruct an image of the inspected object 40 based on the echo signals received. For example, the signal processing device 30 may include an analog signal processor, a digital-to-analog converter (D/A converter) and a digital signal processor. The 2D MIMO array panel 20 transmits a detection signal in the form of microwave and millimeter waves to the inspected object. The echo signal generated after the detection signal reaches the inspected object, which carries echo data corresponding to the equivalent phase centers of the 2D MIMO array panel 20, is received by the 2D MIMO array panel 20. The 2D MIMO array panel 20 transmits the echo signal to the analog signal processor 21. The analog signal processor converts the echo signal received in the form of a power signal into an analog signal and transmits the analog signal to the digital-to-analog converter. The digital-to-analog converter converts the received analog signal into a digital signal and transmits the digital signal to the digital signal processor. The digital signal processor performs an image reconstruction based on the digital signal received.

In some embodiments, the security inspection apparatus 100 may further include a display device 50, as shown in FIG. 1b. The display device 50 may be connected to the signal processing device 20 and may display the image of the inspected object 40 reconstructed by the signal processing device 20. The display device 50 may be implemented as various devices with display functions, such as a display screen, a projector, and so on. In some embodiments, the signal processing device 30 may further determine whether the inspected object contains a dangerous article, based on a preset standard according to the reconstructed image of the inspected object. For example, characteristic templates of dangerous articles such as prohibited seeds, drugs and explosives may be pre-stored, and the reconstructed image may be compared with the templates so as to determine whether the inspected object contains the dangerous article. The signal processing device 30 may further determine a type of the dangerous article, a quantity of the dangerous article, and a probability of containing the dangerous article. After detecting that the inspected object 40 contains the dangerous article, the signal processing device 30 may control the display device 50 to present prompt information. For example, the prompt information may indicate the type of the dangerous article, the probability of containing the dangerous article, etc., to help a security inspector to make a further determination and open a package for inspection if necessary.

In some embodiments, the security inspection apparatus 100 may further include an alarm device 60 connected to the signal processing device 30. In this case, the signal processing device 30 may further determine whether the inspected object 40 contains a dangerous article, based on a preset standard according to the reconstructed image of the inspected object 40, and control the alarm device 60 to issue an alarm if the inspected object 40 contains the dangerous article. The alarm device 60 may be implemented in various forms, including but not limited to a device that issues an alarm by audio, vibration and various other methods, such as a speaker, a vibrator, a siren, etc. An alarm level may also be set. For example, the signal processing device 30 may control the alarm device 60 to issue the alarm with a low volume sound or weak vibration in a case of a low probability of containing the dangerous article, and control the alarm device 60 to issue the alarm with a high volume sound or a strong vibration in a case of a high probability of containing the dangerous article.

In some embodiments, the security inspection apparatus 100 may further include a translation device 70. The translation device 70 may be installed on the security inspection apparatus 100 and used to translate the 2D MIMO array panel 20 within a plane where the 2D MIMO array panel 20 is located. For example, the translation device 70 may translate the 2D MIMO array panel 20 according to a preset path and a preset speed, so that when the 2D MIMO array panel 20 completes a scanning task (that is, when all the transmitting antennas in the 2D MIMO array panel 20 complete a transmission of the detection signal and the receiving antennas completes a reception of the echo signal), the 2D MIMO array panel 20 is translated to a next position to perform a next round of scanning, and so on. In this way, the 2D MIMO array panel 20 may be used to achieve a scanning effect of a plurality of 2D MIMO array panels 20, so that costs are saved, and a system structure is simplified. This will be described in further detail below. In some embodiments, the translation device 70 may include a track, a motor, a connection member, a sliding member, a control circuit, etc. The 2D MIMO array panel 20 may be mounted on the sliding member through the connection member so that the 2D MIMO array panel 20 is movable along the track under the action of the motor.

Figure 2A:
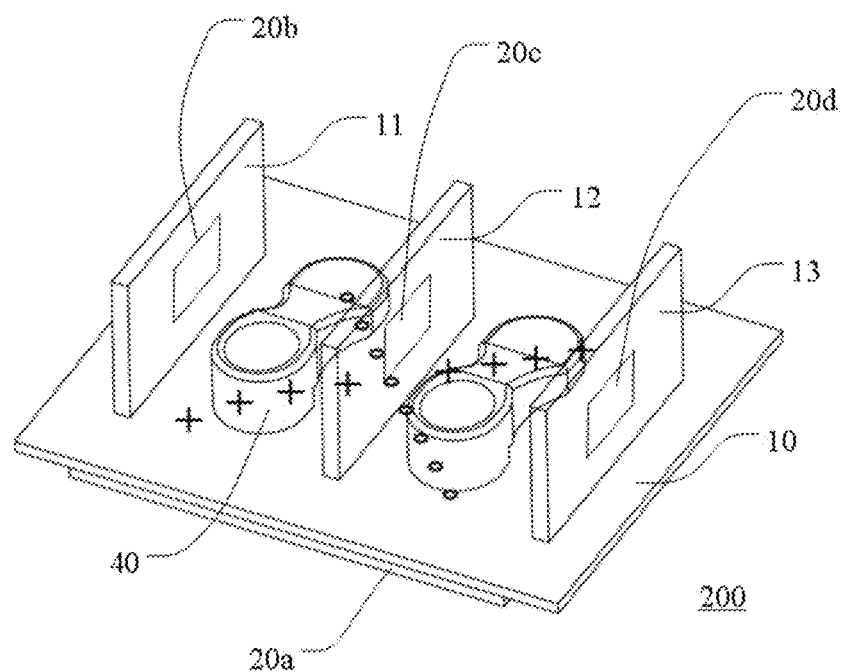
FIG. 2a shows a schematic structural diagram of a security inspection apparatus according to another embodiment of the disclosed technology.
Figure 2B:
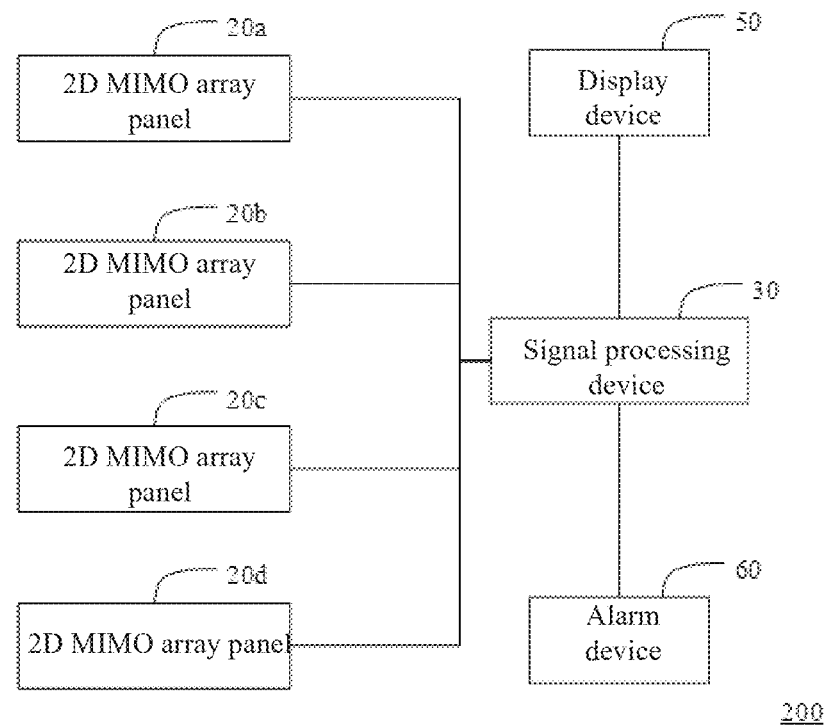

FIG. 2a and FIG. 2b (collectively referred to as FIG. 2) respectively show a schematic structural diagram and a schematic circuit diagram of a security inspection apparatus according to another embodiment of the disclosed technology. A security inspection apparatus 200 in FIG. 2 is similar to the security inspection apparatus 100 in FIG. 1, and the difference is at least that the security inspection apparatus 200 in FIG. 2 further includes three side plates 11, 12 and 13 each is provided (for example, inside or on a surface) with the 2D MIMO array panel described above. For the sake of brevity, the difference is mainly described in detail below. In FIG. 2, the 2D MIMO array panel installed on the bottom plate 10 is denoted as 20a, and the 2D MIMO array panels installed on the side plates 11, 12 and 13 are denoted as 20b, 20c and 20d, respectively. The 2D MIMO array panels 20a, 20b, 20c and 20d are collectively referred to as the 2D MIMO array panel 20. A first detection space is formed between the side plate 11 and the side plate 12, and a second detection space is formed between the side plate 12 and the side plate 13. In FIG. 2a, the first detection space and the second detection space may respectively accommodate two parts of the inspected object 40, such as a left human foot and a right human foot. The 2D MIMO array panel 20a installed to (for example, inside or under) the bottom plate 10 may be used to scan a bottom (such as a sole) of the inspected object 40 (such as human feet), and the 2D MIMO array panels 20b, 20c and 20d installed inside or on a surface of the side plates 11, 12 and 13 may be used to scan sides of the inspected object 40 (such as human feet).

The signal processing device 30 is connected to the 2D MIMO array panels 20a, 20b, 20c and 20d. The signal processing device 30 may have the structure described above, and certainly may adopt other suitable structures. The 2D MIMO array panels 20a, 20b, 20c and 20d transmit detection signals respectively from different positions to different parts of the inspected object 40 and receive echo signals from the parts of the inspected object 40. For example, the 2D MIMO array panel 20a may transmit the detection signal to the bottom of the human feet and receive the echo signal from the bottom of the human feet. The 2D MIMO array panels 20b and 20c transmit the detection signals respectively to both sides of the left human foot and receive corresponding echo signals. The 2D MIMO array panels 20c and 20d transmit the detection signals respectively to both sides of the right human foot and receive corresponding echo signals. The signal processing device 30 may reconstruct an image of a part of the inspected object 40 corresponding to each of the 2D MIMO array panels 20a, 20b, 20c and 20d according to the echo signal of the 2D MIMO array panel. For example, an image of the bottom of the human feet may be reconstructed according to the echo signal received by the 2D MIMO array panel 20a, an image of both sides of the left human foot is reconstructed according to the echo signals received by the 2D MIMO array panels 20b and 20c, and an image of both sides of the right human foot is reconstructed according to the echo signals received by the 2D MIMO array panels 20c and 20d. The signal processing device 30 may also reconstruct an image of a part or a whole of the inspected object 40 based on a combination of the echo signals of the 2D MIMO array panels 20a, 20b, 20c and 20d.

Although the three side plates 11, 12 and 13 each provided with a 2D MIMO array panel are illustrated above by way of example, it should be clear to those skilled in the art that the embodiments of the disclosed technology are not limited thereto. The number and arrangement of the side plates as well as those of the 2D MIMO array panels in the side plates may be designed as desired. For example, there may be provided a side plate which is perpendicular to the bottom plate and is located above the 2D MIMO array panel arranged in the bottom plate. Spaces on both sides of the side plate are used to accommodate the left human foot and the right human foot. At least one 2D MIMO array panel is provided respectively on left and right side surfaces of the side plate or may be provided inside the side plate so as to respectively scan a right side of the left foot and a left side of the right foot. In some embodiments, shapes and sizes of the bottom plate and the side plates may also be set as desired so as to adapt to shapes and sizes of different inspected objects. For example, the side plate may be designed in an arc shape, an irregular shape, etc., and the bottom plate may be designed in a circular shape, an irregular shape, etc. In some embodiments, a 2D MIMO array panel extending in other directions may be provided. For example, a top plate located above the side plate may be provided, and the 2D MIMO array panel may be provided in the top plate so as to, for example, scan an upper surface of the human foot. This will not be repeated here.

In some embodiments, the security inspection apparatus described above may be used in combination with other security inspection apparatus. For example, it may be installed under a millimeter wave detection based security inspection door. The inspected object may stand on the security inspection apparatus so that the feet may be imaged while the inspected object waits for a scanning detection of the millimeter wave security inspection door. A detection and imaging process of the security inspection apparatus may be performed simultaneously with that of the millimeter wave security inspection door, and the display device and/or the alarm device may be shared.

A structure of the 2D MIMO antenna array 21 in the 2D MIMO array panel 20 according to the embodiments of the disclosed technology will be described below with reference to FIG. 3 to FIG. 10. According to the embodiments of the disclosed technology, the 2D MIMO array panel 20 may be implemented by using a 10 GHz~40 GHz chip, and the 2D MIMO antenna array 21 in the 2D MIMO array panel 20 may include a plurality of transmitting antennas and a plurality of receiving antennas arranged in an array. The transmitting antennas and the receiving antennas may be installed on a substrate and arranged in various forms as desired. The 2D MIMO antenna array 21 may include at least one 2D MIMO sub-array. A size of each sub-array is determined according to a tolerable error in case of using the equivalent phase center, and is related to an imaging distance (detection distance). In the embodiments of the disclosed technology, in each 2D MIMO sub-array, a distance between adjacent transmitting antennas and/or a distance between adjacent receiving antennas may be an integer multiple (for example, 1 time, 2 times, 3 times, 4 times, 5 times, etc.) of a wavelength of the detection signal corresponding to one of a plurality of frequencies (for example, a center operating frequency). A distance between adjacent equivalent phase centers may be half of the wavelength of the detection signal corresponding to one of the plurality of frequencies. A size of the 2D MIMO antenna array 21 may be designed to be the same as an imaging area, or slightly smaller or slightly larger than the imaging area, so as to ensure that the image of the inspected object may be reconstructed correctly. For example, the 2D MIMO antenna array may have a length that ranges from 30 cm to 50 cm and a width that from 30 cm to 50 cm. The imaging distance of the 2D MIMO antenna array 21 (that is, the distance between the 2D MIMO antenna array 21 and the inspected object) may range from 2 cm to 30 cm.

Figure 3A:
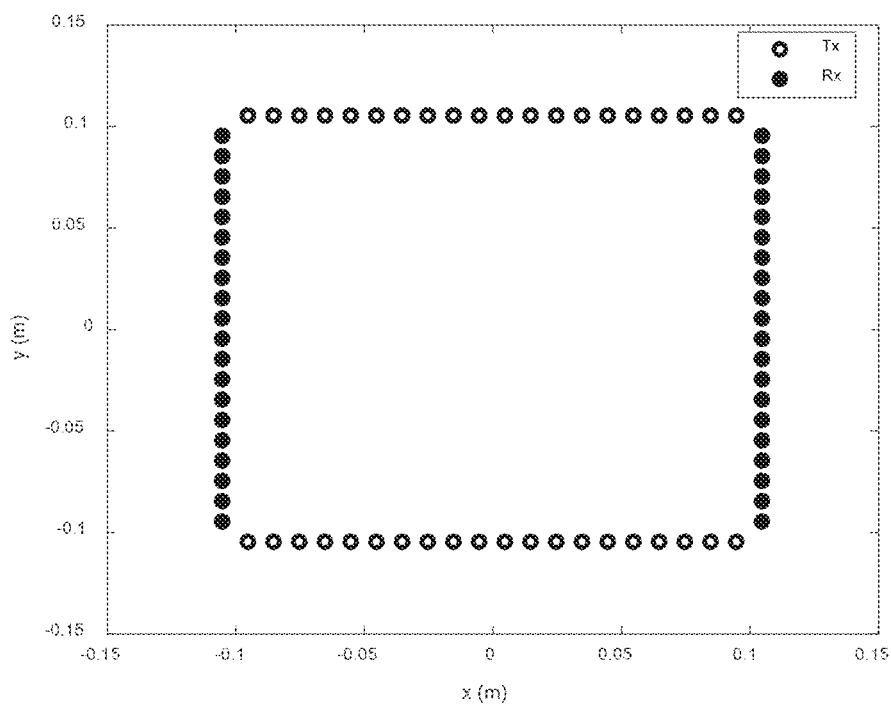
FIG. 3a shows a schematic structural diagram of a 2D MIMO antenna array according to an embodiment of the disclosed technology.
Figure 3B:
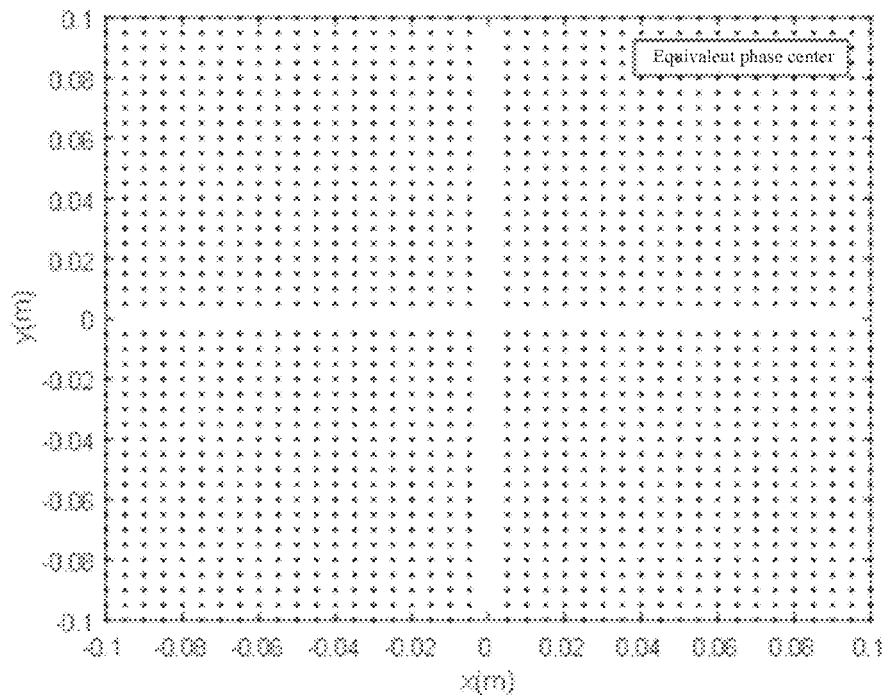

FIG. 3a and FIG. 3b (collectively referred to as FIG. 3) respectively show a schematic structural diagram of a 2D MIMO antenna array according to an embodiment of the disclosed technology and a schematic diagram of equivalent phase centers of the 2D MIMO antenna array.

As shown in FIG. 3a, the 2D MIMO antenna array includes a sub-array including two rows of transmitting antennas Tx arranged in a horizontal direction and two columns of receiving antennas Rx arranged in a vertical direction. The two rows of transmitting antennas Tx and the two columns of receiving antennas Rx form a rectangular pattern. In FIG. 3a, the 2D MIMO antenna array may have a size of 30 cm×30 cm, and include 46 transmitting antennas Tx and 46 receiving antennas Rx. For the sake of brevity, numbers of the transmitting antennas Tx and the receiving antennas Rx shown are only for illustration, not actual numbers.

As shown in FIG. 3b, an equivalent position for transmitting and receiving signals may be represented by a phase center of the antenna. The equivalent position is a physical center of two independent antennas or apertures. In the embodiments of the disclosed technology, the midpoint of the connection line between the transmitting antenna and the corresponding receiving antenna is taken as the equivalent phase center of the two. Under the MIMO architecture, one transmitting antenna Tx corresponds to a plurality of receiving antennas Rx. In the embodiments of the disclosed technology, the receiving antennas Rx and the transmitting antennas Tx are set not in the same position. This system in which the transmitting and receiving antennas are spatially separated may be simulated by using a virtual system in which a virtual position is added between each group of the transmitting antennas Tx and the receiving antennas Rx. This position is called the equivalent phase center. The echo data collected by the group of transmitting and receiving antennas may be equivalent to an echo collected by a transceiver antenna at the equivalent phase center.

In the 2D MIMO antenna array in FIG. 3, a distance between adjacent transmitting antennas is a wavelength λ of the detection signal, a distance between adjacent receiving antennas is also the wavelength λ of the detection signal, and a distance between adjacent equivalent phase centers is λ/2. A sampling interval of imaging (that is, an interval of the equivalent phase centers) is on the order of λ/2, which makes the reconstructed image without artifact superimposition.

Figure 4:
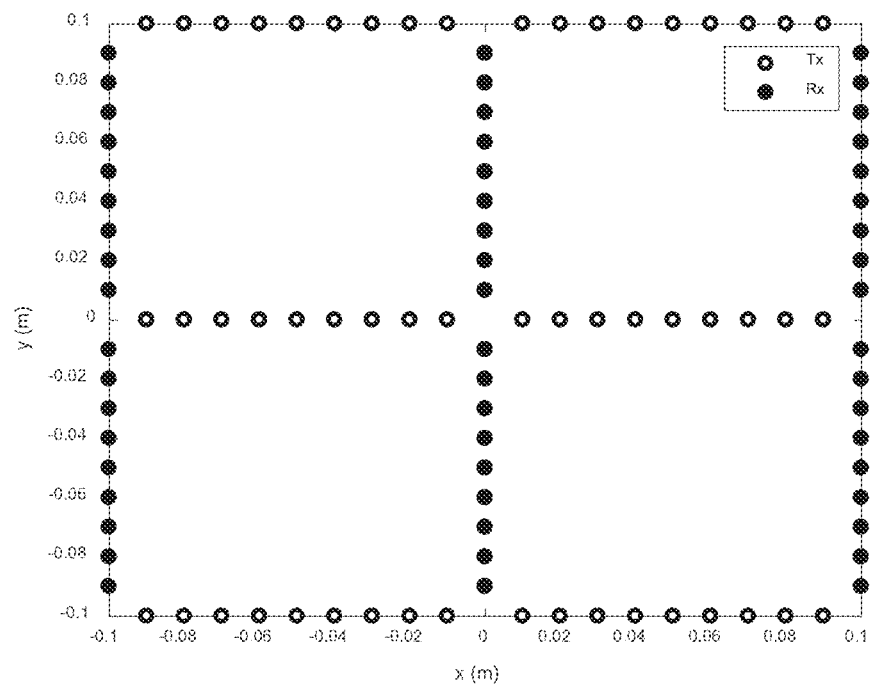
FIG. 4 shows a schematic structural diagram of a 2D MIMO antenna array according to another embodiment of the disclosed technology.

FIG. 4 shows a schematic structural diagram of a 2D MIMO antenna array according to another embodiment of the disclosed technology. As shown in FIG. 4, the 2D MIMO antenna array includes 2×2 sub-arrays. Each sub-array has a size of 10 cm×10 cm, and an overall size of the 2D MIMO antenna array is 20 cm×20 cm. The 2D MIMO antenna array 21 includes 141 transmitting antennas Tx and 141 receiving antennas Rx.

Figure 5:
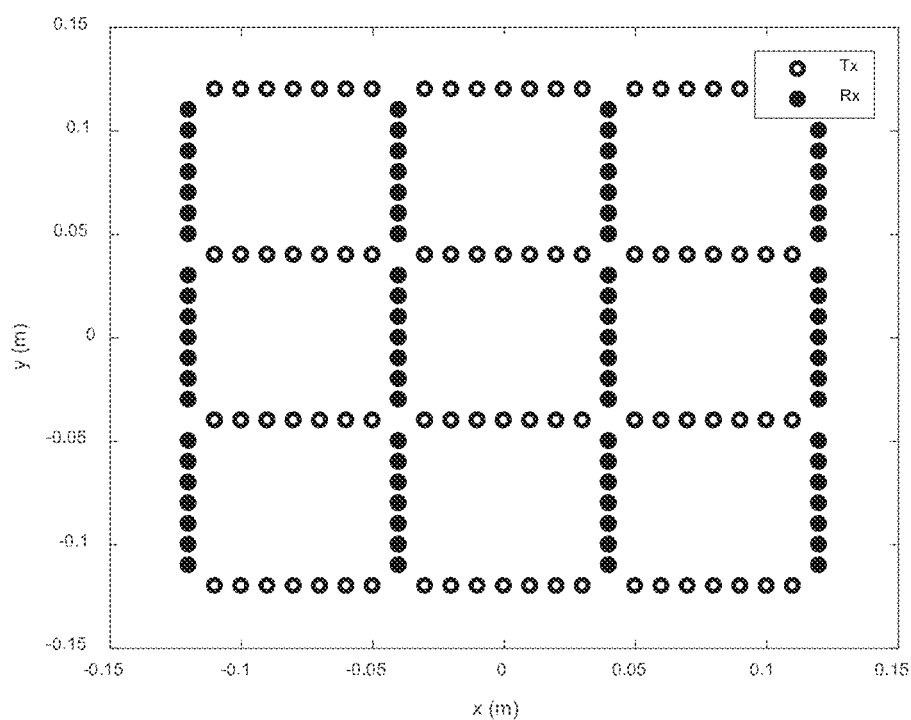
FIG. 5 shows a schematic structural diagram of a 2D MIMO antenna array according to another embodiment of the disclosed technology.

FIG. 5 shows a schematic structural diagram of a 2D MIMO antenna array according to another embodiment of the disclosed technology. As shown in FIG. 5, the 2D MIMO antenna array 21 includes 3×3 sub-arrays. Each sub-array has a size of 8 cm×8 cm, and the overall size of the 2D MIMO antenna array 21 is 24 cm×24 cm. The 2D MIMO antenna array includes 224 transmitting antennas Tx and 224 receiving antennas Rx.

Figure 6:
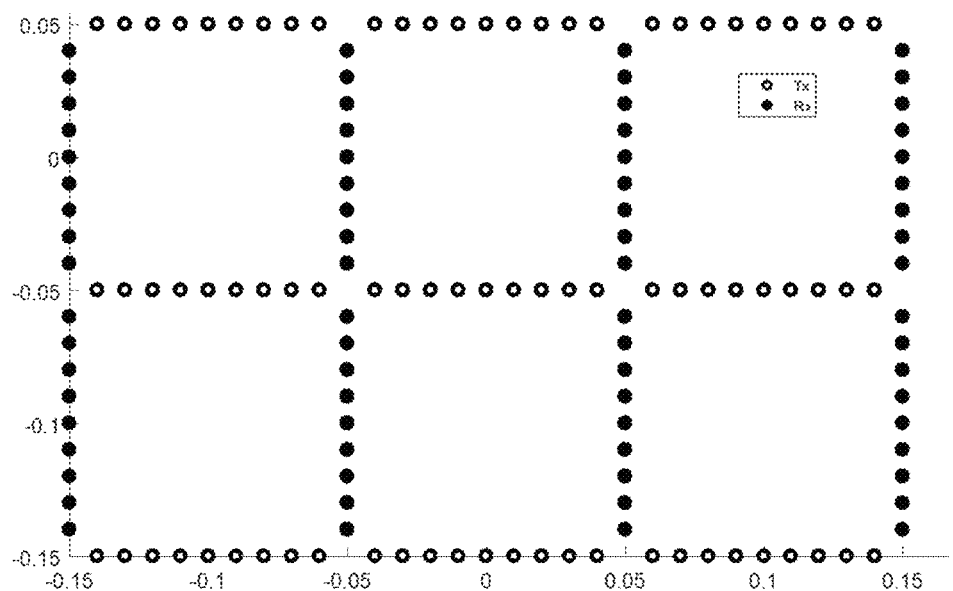
FIG. 6 shows a schematic structural diagram of a 2D MIMO antenna array according to another embodiment of the disclosed technology.

FIG. 6 shows a schematic structural diagram of a 2D MIMO antenna array according to another embodiment of the disclosed technology. As shown in FIG. 6, the 2D MIMO antenna array 21 may include 2×3 sub-arrays. Each sub-array has a size of 10 cm×8 cm, and the overall size of the 2D MIMO antenna array 21 is 20 cm×30 cm. The 2D MIMO antenna array 21 includes 188 transmitting antennas Tx and 213 receiving antennas Rx.

Figure 7:
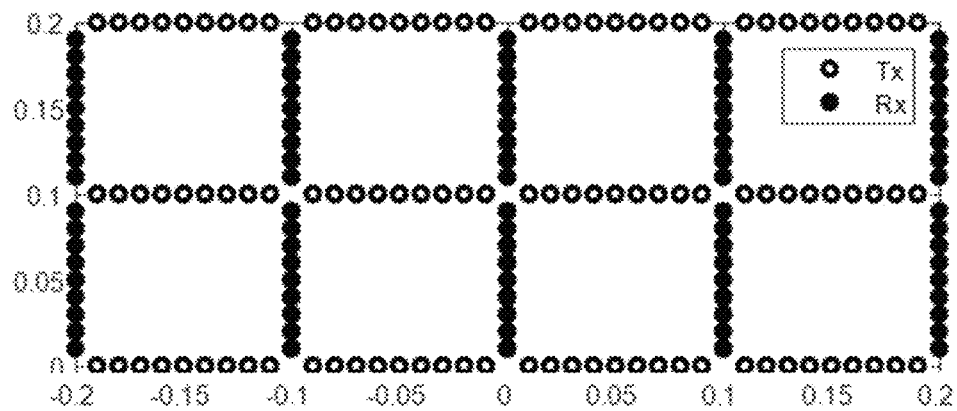
FIG. 7 shows a schematic structural diagram of a 2D MIMO antenna array according to another embodiment of the disclosed technology.

FIG. 7 shows a schematic structural diagram of a 2D MIMO antenna array according to another embodiment of the disclosed technology. As shown in FIG. 7, the 2D MIMO antenna array includes 2×4 sub-arrays. Each sub-array has a size of 10 cm×8 cm, and the overall size of the 2D MIMO antenna array 21 is 20 cm×40 cm. The 2D MIMO antenna array 21 includes 285 transmitting antennas Tx and 235 receiving antennas Rx.

In addition to the 10 GHz~40 GHz chip mentioned above, the 2D MIMO array panel 20 may also be implemented as a MIMO chip with other frequencies in the range of 2 GHz~10 GHz. The 2D MIMO antenna array 21 in the 2D MIMO array panel 20 may have a length of 30 cm~50 cm and a width of 30 cm~50 cm, and have an imaging distance (that is, the distance between the 2D MIMO antenna array 21 and the inspected object) of 2 cm~30 cm. Table 1 shows the number of the transmitting antennas Tx and the receiving antennas Rx in different frequency bands for two different sub-array sizes in a case where the overall size of the 2D MIMO antenna array is 30 cm×30 cm, where * represents a center frequency. For example, as shown in Table 1, for the 2D MIMO antenna array of 30 cm×30 cm, if the size of the sub-array is 30 cm×30 cm, then for the detection signal in the 2 GHz~20 GHz band, the number of the transmitting antennas is 18 and the number of the receiving antennas is 18. If the size of the sub-array is 15 cm×15 cm, then for the detection signal in the 2 GHz~20 GHz band, the number of the transmitting antennas is 24, the number of the receiving antennas is 24, and so on.

TABLE 1

| Frequency/ GHz | Area array of 30 cm*30 cm | |
|---|---|---|
| | Sub-array of 30 cm*30 cm | Sub-array of 15 cm*15 cm |
| 2-20 | 18 + 18 | 24 + 24 |
| 10-20 | 26 + 26 | 36 + 36 |
| 10-40 | 46 + 46 | 66 + 66 |
| 24-30 | 50 + 50 | 72 + 72 |
| 24-40 | 60 + 60 | 87 + 87 |
| 40-60 | 96 + 96 | 141 + 141 |
| 70-80 | 146 + 146 | 216 + 216 |
| 76-81 | 154 + 154 | 228 + 228 |
| 89-99 | 184 + 184 | 273 + 273 |
| 75-110 | 182 + 182 | 270 + 270 |

Figure 8A:
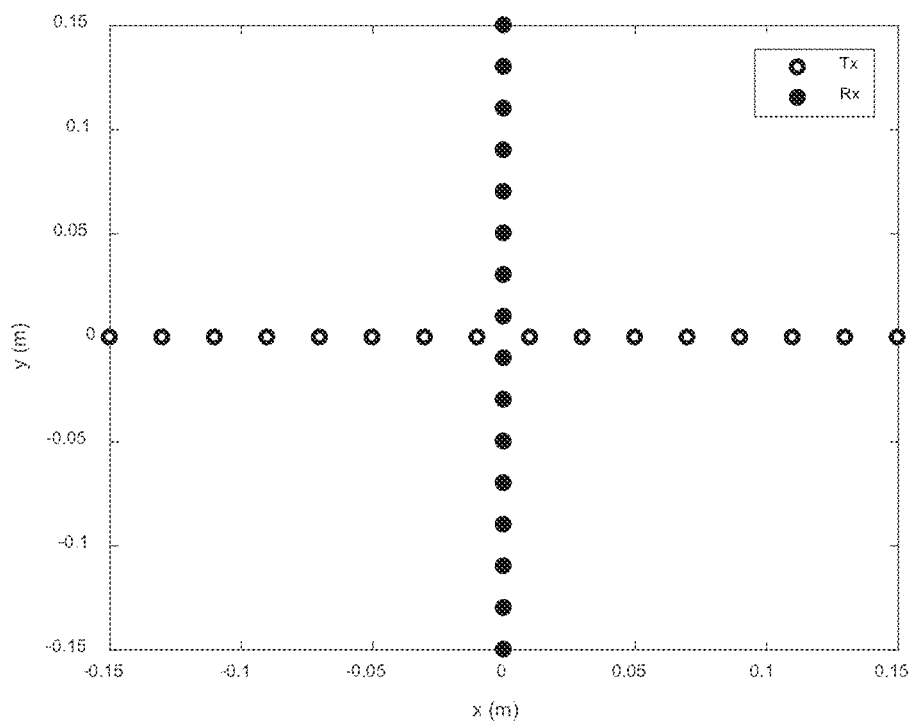
FIG. 8a shows a schematic structural diagram of a 2D MIMO antenna array according to another embodiment of the disclosed technology.
Figure 8B:
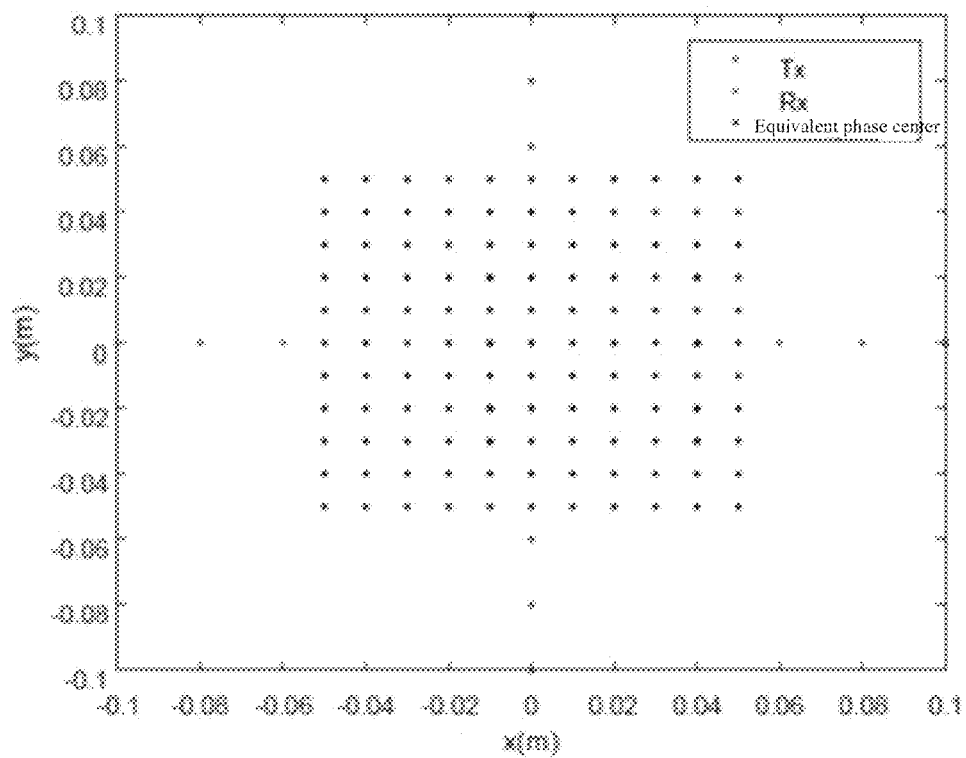

FIG. 8*a* shows a schematic structural diagram of a 2D MIMO antenna array according to another embodiment of the disclosed technology. FIG. 8*b* shows a schematic diagram of equivalent phase centers of the 2D MIMO antenna array of FIG. 8*a*. As shown in FIG. 8*a*, the 2D MIMO antenna array includes a sub-array including a row of transmitting antennas Tx arranged in the horizontal direction and a column of receiving antennas Rx arranged in the vertical direction. The row of transmitting antennas Tx and the column of receiving antennas Rx intersect to form a cross-shaped pattern. As shown in FIG. 8*b*, the equivalent phase centers of the 2D MIMO antenna array of FIG. 8*a* are distributed in a center of the cross-shaped pattern in the form of an array.

Figure 9A:
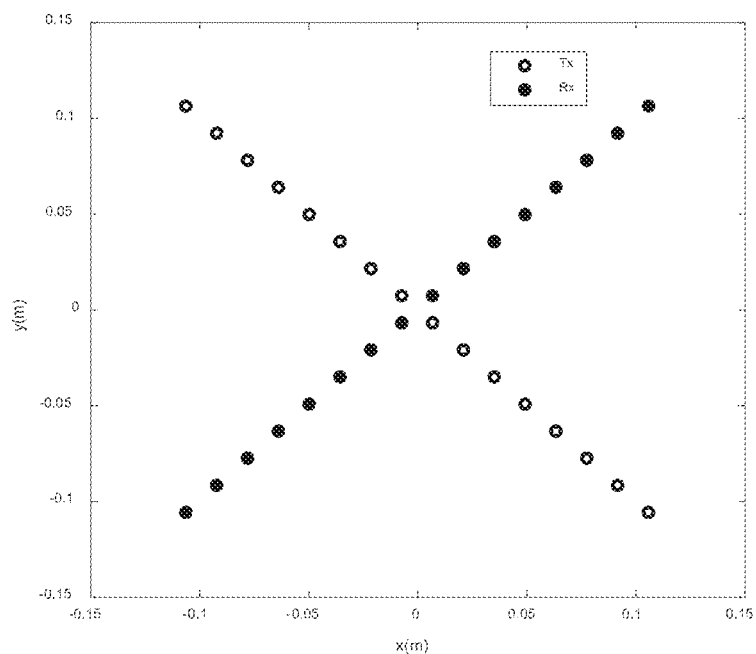
FIG. 9a shows a schematic structural diagram of a 2D MIMO antenna array according to another embodiment of the disclosed technology.
Figure 9B:
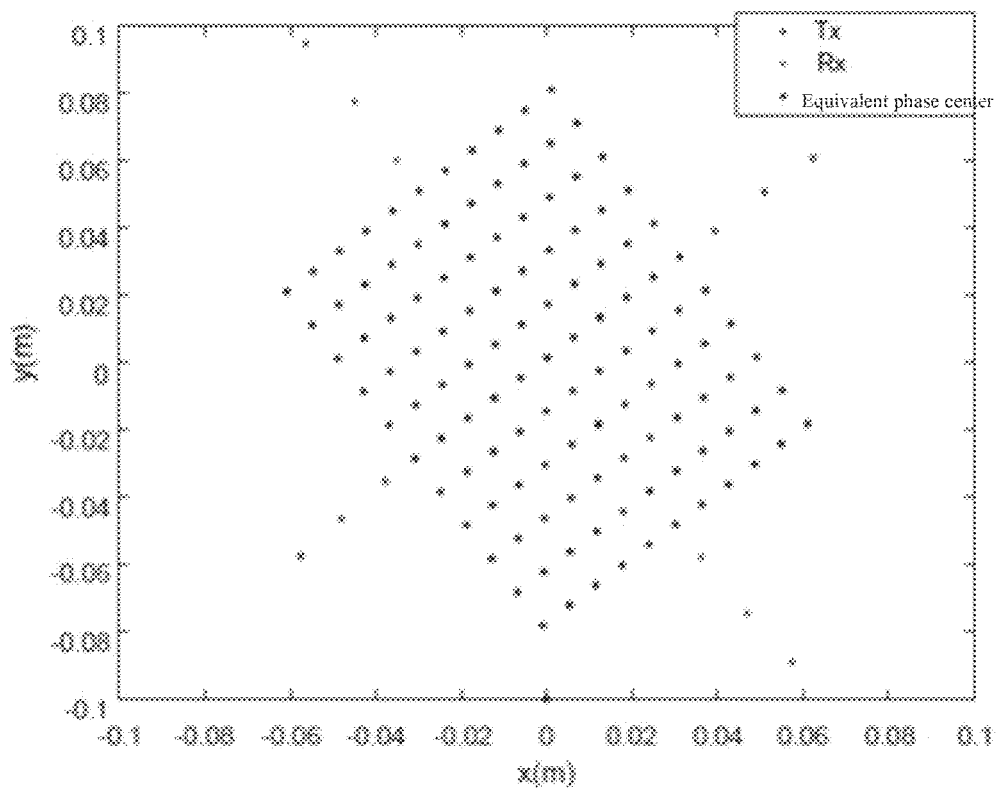

FIG. 9*a* shows a schematic structural diagram of a 2D MIMO antenna array according to another embodiment of the disclosed technology. FIG. 9*b* shows a schematic diagram of equivalent phase centers of the 2D MIMO antenna array of FIG. 9*a*. As shown in FIG. 9*a*, the 2D MIMO antenna array includes a sub-array including a row of transmitting antennas Tx arranged in a first diagonal direction of the array and a row of receiving antennas Rx arranged in a second diagonal direction of the array. The row of transmitting antennas Tx and the row of receiving antennas Rx cross to form a diagonal cross-shaped pattern on the panel. As shown in FIG. 9*b*, the equivalent phase centers of FIG. 9*b* are rotated by 45 degrees (clockwise or counter-clockwise) relative to the equivalent phase centers of FIG. 8*b*. This is because the 2D MIMO antenna array of FIG. 9*a* is rotated by 45 degrees relative to the 2D MIMO antenna array of FIG. 8*a*.

It should be clear to those skilled in the art that the above are only examples, and the structure of the 2D MIMO antenna array 11 of the disclosed technology is not limited to this. The size of the sub-array, the size of the array, the arrangement of the antennas in the sub-array, and the number of antennas may be adjusted as desired.

Figure 10:
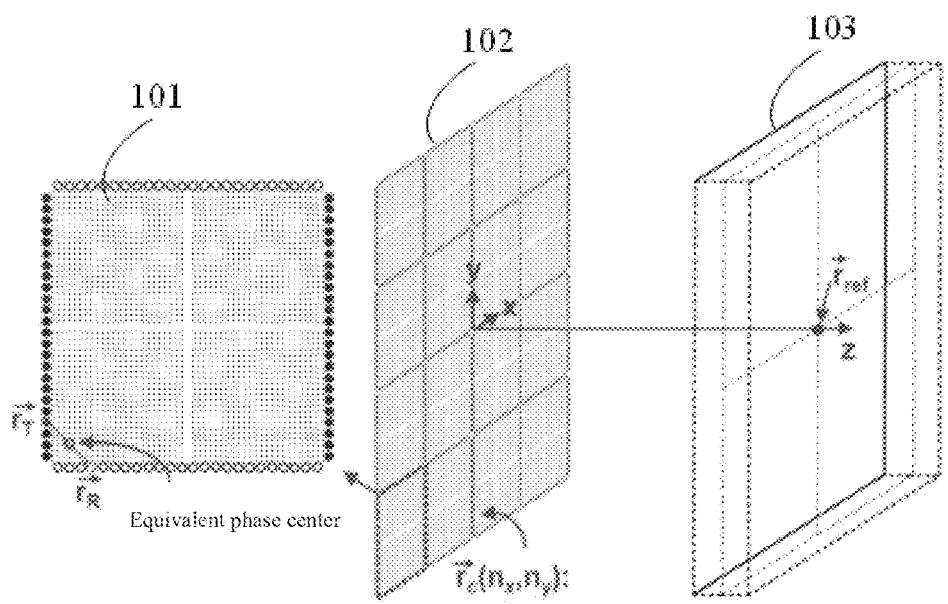
FIG. 10 shows a schematic diagram of a working principle of a 2D MIMO antenna array according to an embodiment of the disclosed technology.

The operation principle of the 2D MIMO antenna array according to the embodiments of the disclosed technology will be described below with reference to FIG. 10. As shown in FIG. 10, a 2D MIMO antenna array including 4×4 sub-arrays is illustrated by way of example. Each sub-array 101 has the structure shown in FIG. 2, the equivalent phase centers formed are arranged in the form of an array 102 (also referred to as an equivalent phase center net), and $(n_x, n_y)$ represents coordinates of the equivalent phase center in the array (the equivalent phase center net). A central reference point of an imaging area 103 of the 2D MIMO antenna array is represented as ref, and the inspected object contains a point scatterer positioned at the central reference point.

When the security inspection is performed, the 2D MIMO antenna array described above may be controlled by electronic scanning.

As an example, the control circuit may control the transmitting antennas in each sub-array of the 2D MIMO antenna array to sequentially transmit the detection signal, control the receiving antennas to receive the echo signal, then control a next sub-array, and repeat the operation until the scanning of the entire antenna array is completed, so as to obtain all scattering data of the inspected object from different viewing angles. As another example, the control circuit may control all the transmitting antennas in the 2D MIMO antenna array to sequentially transmit the detection signal, and control all the receiving antennas in the 2D MIMO antenna array to receive the echo signal. In a case that the 2D MIMO antenna array includes only one sub-array, the image may be reconstructed by using a holographic reconstruction algorithm as described below. In a case that the 2D MIMO antenna array includes a plurality of sub-arrays, the image may be reconstructed by using a backward projection algorithm as described below.

In the embodiments of the disclosed technology, a microwave millimeter wave with a frequency in the range of 10~300 GHz is used as the detection signal. The wave in this band has no ionization damage to the human body and may be used for human body security inspection. In the embodiments of the disclosed technology, the 2D MIMO antenna array includes a plurality of transmitting antennas and a plurality of receiving antennas arranged in a two-dimensional array, which operate in way of electronic scanning. Electronic scanning has the advantage of fast detection speed. By combining with a three-dimensional holographic algorithm based on Fast Fourier Transform (FFT), real-time imaging may be realized. A transmitting antenna and a corresponding receiving antenna in the 2D MIMO antenna array may generate an equivalent phase center. The echo data collected by a pair of the transmitting antenna and the receiving antenna may be equivalent to the echo collected by a transceiver antenna at the equivalent phase center. The equivalent phase centers are arranged in an array, and the interval between adjacent equivalent phase centers is substantially half of the wavelength λ of the detection signal, so that the entire equivalent phase center array is substantially a full array. Further, the sampling interval (that is, the interval of the equivalent phase centers) of the imaging system is in the order of λ/2, so that there is no artifact superimposition in the image generated, and a clearer image may be formed, thereby improving a speed of image processing.

Figure 11:
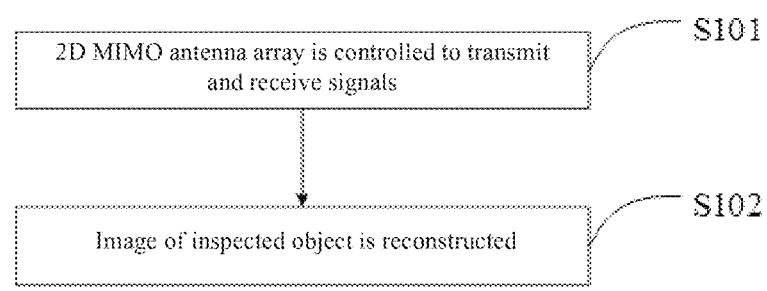
FIG. 11 shows a schematic flowchart of a method of controlling a security inspection apparatus according to an embodiment of the disclosed technology.

FIG. 11 shows a schematic flowchart of a method of controlling a security inspection apparatus according to an embodiment of the disclosed technology.

In step S101, the 2D MIMO array panel 20 is controlled to transmit a detection signal to the inspected object and receive an echo signal from the inspected object. For example, the control circuit 22 may be used to control the 2D MIMO antenna array 21 to transmit the detection signal to the inspected object and receive the echo signal in the manner described above. The detection signal may be an electromagnetic wave, such as a millimeter wave, specifically a millimeter wave terahertz wave.

In step S102, an image of the inspected object is reconstructed based on the echo signal received. For example, the image of the inspected object may be reconstructed by using a full-system reconstruction algorithm or a backward projection algorithm.

The holographic reconstruction algorithm may be used to realize a real-time reconstruction of the image of the inspected object. The echo data collected by a pair of transmitting and receiving antennas may be equivalent to the echo collected by a transceiver antenna at the equivalent phase center. The signal processing device collects the echo data at the equivalent phase center. Assuming that collected reflection data of the inspected object is $s(n_x, n_y)$, the reflection data is corrected by the following formula to obtain a corrected reflection data matrix:

$$\hat{s}(n_x, n_y) = s(n_x, n_y) \frac{R_o(n_x, n_y)}{R_u(n_x, n_y)}.$$

where is an uncorrected scattering data matrix, and $n_x$ and $n_y$ are positions of the equivalent phase center in the equivalent phase center network (that is, row and column indices).

$R_u(n_x, n_y)$ and $R_o(n_x, n_y)$ are calculated by following formulas $$R_u(n_x, n_y) = e^{-jk|\vec{r}_T(n_x, n_y) - \vec{r}_{ref}|} e^{-jk|\vec{r}_{ref} - \vec{r}_R(n_x, n_y)|},$$

$$\text{and } R_o(n_x, n_y) = e^{-j2k|\vec{r}_c(n_x, n_y) - \vec{r}_{ref}|}.$$

As shown in FIG. 10, $\vec{r}_{ref}$ represents the reference point of the center of the imaging area 103, j represents an imaginary number, and k represents a space constant.

$R_u(n_x, n_y)$ represents a calculated reflection set. In this case, the following inspected object is sampled as shown in FIG. 10, and the inspected object contains a point scatterer located at $\vec{r}_{ref}$.

$R_o(n_x, n_y)$ represents a calculated reflection set, which is obtained in a case where the equivalent phase center network of multi-input multi-output apertures is sampled (as shown in FIG. 10).

Then a two-dimensional Fourier transform algorithm is used for reconstruction so as to obtain a scattering coefficient of the inspected object:

$$I(x, y) = IFFT_{2D}\left[FFT_{2D}\left[s(n_x, n_y) \frac{R_o(n_x, n_y)}{R_u(n_x, n_y)}\right] \cdot e^{-j\sqrt{4k^2 - k_x^2 - k_y^2} z_0}\right].$$

where $I(x, y)$ represents the scattering coefficient of the inspected object, $z_0$ represents a distance between the 2D MIMO array panel and the inspected object, j represents an imaginary number, k is a propagation constant, and $k_x$, $k_y$ are respectively spatial propagation constants; $FFT_2D$ indicates a two-dimensional Fourier transform, and $IFFT_2D$ indicates a two-dimensional inverse Fourier transform.

After completing the two-dimensional aperture scanning, the collected echo data may be expressed as $s(N_x, n_y)$. Finally, combined with the fast Fourier transform-based synthetic aperture holography algorithm, fast reconstruction may be achieved and the imaging is completed. The purpose of the imaging algorithm is to reverse the image of the inspected object, that is, the scattering coefficient of the inspected object, from the echo expression. The Fourier transform-based synthetic aperture holographic algorithm does not need to reconstruct the entire imaging area point by point, but reconstruct the correct imaging area at one time by using the advantages of fast Fourier transform. Therefore, this algorithm may realize fast scanning and fast image reconstruction, thus achieving real-time imaging. The reconstructed image is displayed on the display device. Combined with a suspicious object alarm algorithm, an alarm for a suspicious object may be issued.

The backward projection algorithm originated from the computer tomography technology, and is an accurate imaging algorithm based on time-domain signal processing. The basic idea is that for each imaging point in the imaging area, a delay between the point and the receiving and transmitting antennas is calculated to coherently superimpose the contributions of all echoes thereto, so as to obtain the corresponding pixel value of the point in the image. In this way, a coherent superposition processing is performed on the entire imaging area point by point so that an image of the imaging area is obtained. The backward projection algorithm is naturally easy to implement parallel calculations, and is therefore suitable for a case where the receiving antennas in a plurality of sub-arrays receive the reflected electromagnetic waves at the same time. Although it is necessary to reconstruct every point in the entire imaging area, if the hardware in the processing system adopts GPU or FPGA technology, the reconstruction time may be greatly reduced, and even real-time reconstruction may be realized.

A reconstruction formula may be expressed as $$\hat{O}(x, y, z) = \sum_{\forall k} \sum_{\forall y_r} \sum_{\forall x_r} \sum_{\forall y_t} \sum_{\forall x_t} s(x_t, y_t, x_r, y_r, k) \cdot$$
$$\exp\left(+jk\sqrt{(x_t - x)^2 + (y_t - y)^2 + (z_a - z)^2}\right) \cdot$$
$$\exp\left(+jk\sqrt{(x_r - x)^2 + (y_r - y)^2 + (z_a - z)^2}\right)$$

where $\hat{O}(x, y, z)$ is a scattering coefficient of the inspected object, $z_a$ is an imaging distance, j is an imaginary unit, k is a propagation constant, s (x, y, x, y, k) is the echo signal of the inspected object received by a pair of transmitting antenna and receiving antenna, $(x_t, y_t)$ is coordinates of the transmitting antenna, $(x_r, y_r)$ is coordinates of the receiving antenna, and z represents a distance between the 2D MIMO array panel and a certain fault of the inspected object.

Subsequent to the step S102, other steps, such as analyzing the reconstructed image of the inspected object so as to determine whether the inspected object is carrying a dangerous article, may be performed, and if yes, the alarm device is controlled to issue an alarm. For example, the reconstructed image of the inspected object may be compared with a pre-stored template. If a degree of matching with a characteristic template of a certain dangerous article is greater than the preset threshold, it is determined that the inspected object may contain the dangerous article, or otherwise it is determined that the inspected object does not contain the dangerous article. In some embodiments, a probability of containing the dangerous article may also be determined according to the degree of matching. For example, a high degree of matching indicates a high probability of containing the dangerous article, and a low degree of matching indicates a low probability of containing the dangerous article. A method of issuing the alarm includes but is not limited to a screen display, an audio alarm, a vibration alarm, and so on. An alarm level may also be set. For example, in a case of a low probability of containing the dangerous article, the alarm may be issued with a low volume sound or weak vibration, and in a case of a high probability of containing the dangerous article, the alarm may be issued with a high volume sound or a strong vibration.

In addition, the reconstructed image of the inspected object and/or a result of the determination described above may also be presented to a user through the display device. For example, after the image is reconstructed, the reconstructed image may be displayed on the display screen, and then an analysis result may be presented on the display screen. It is also possible to display the reconstructed image and the result of determination on the display screen after the image reconstruction and analysis comparison are completed. A method of presenting the result of determination (such as the dangerous article that may be contained and the probability of containing the dangerous article) may be selected according to needs. In addition to being displayed on the display screen as described above, the result of determination may also be presented by audio, vibration and other methods. For example, the result of determination may be played in the form of voice, or may be indicated by different alarm volumes or vibration intensities. For example, a high-volume alarm means a high probability of containing the dangerous article, and a low-volume alarm means a low possibility of containing the dangerous article.

Figure 12:
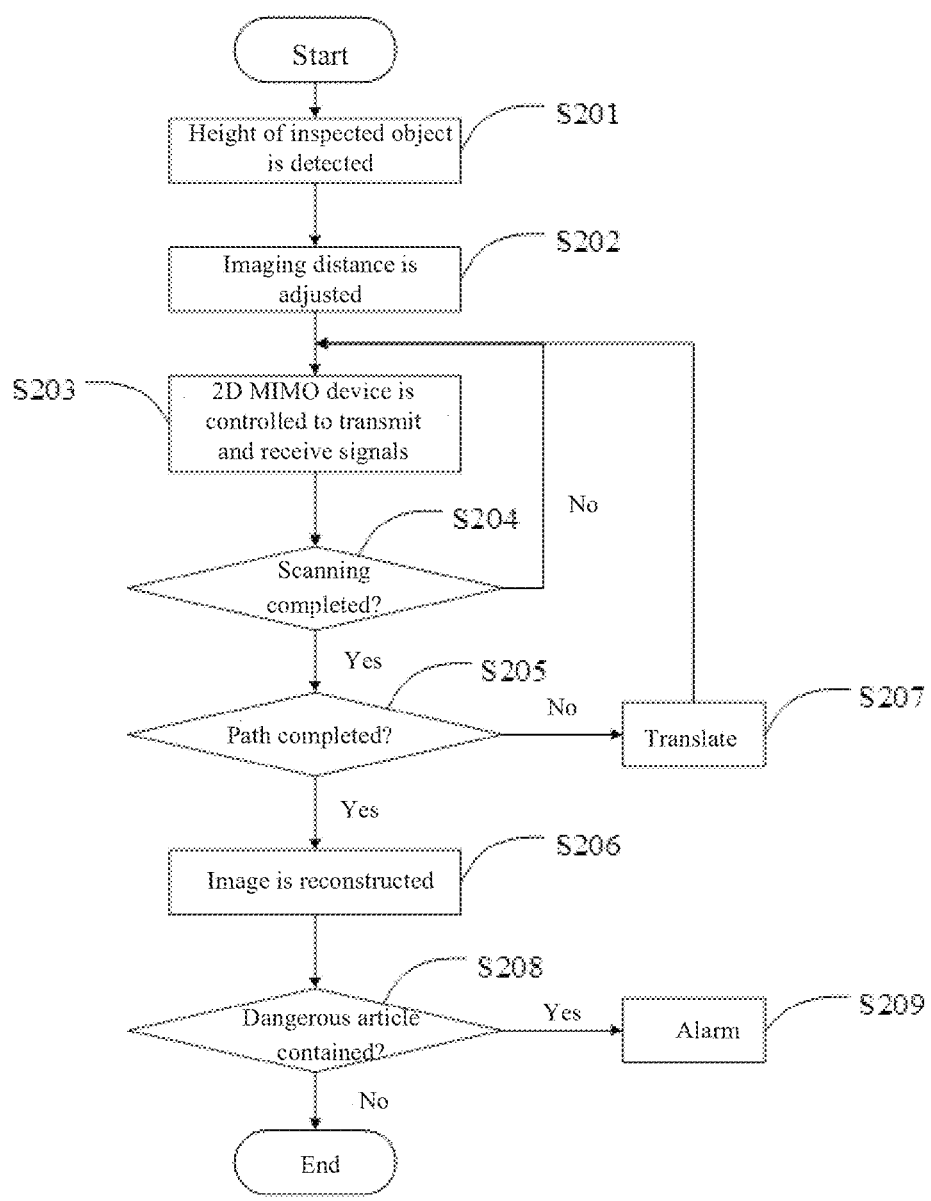
FIG. 12 shows a schematic flowchart of a method of controlling a security inspection apparatus according to another embodiment of the disclosed technology.

FIG. 12 shows a schematic flowchart of a method of controlling a security inspection apparatus according to another embodiment of the disclosed technology.

In step S201, the 2D MIMO array panel is controlled to transmit a detection signal to the inspected object and receive an echo signal from the inspected object. In this embodiment, a combination of electronic scanning and mechanical scanning is used. In this step, the 2D MIMO array panel performs the electronic scanning at a current position.

In step S202, it is determined whether the 2D MIMO array panel has completed the electronic scanning (that is, all the transmitting antennas have completed transmission and all the receiving antennas have completed reception). If so, it means that the scanning at the current position is completed, and step S203 is performed to move to a next position. If not, the step S201 is performed to continue the scanning at the current position. FIG. 10 shows a schematic diagram of a scanning route of a combination of the mechanical scanning and the electronic scanning of the security inspection apparatus according to the embodiments of the disclosed technology. As shown in FIG. 10, in a case that a 2D MIMO array panel of 5 cm×5 cm performs the mechanical scanning on an area array of 30 cm×30 cm, the 2D MIMO array panel may be translated by one step (for example, 5 cm) each time along a path indicated by an arrow in FIG. 10, until the scanning of all positions on the path is completed, so as to realize the scanning for the area array of 30 cm×30 cm.

In step S203, it is determined whether the mechanical scanning is completed, that is, whether the electronic scanning at a last position on the translation path is completed. If so, it means that the 2D MIMO array panel has completed the scanning at all positions on the path, and the scanning for the inspected object is completed, then step S204 is performed for image reconstruction. If not, step S205 is performed to move to the next position for scanning.

In step S204, an image of the inspected object is reconstructed by using the echo signal received. The reconstruction algorithm includes, but is not limited to the full-system reconstruction algorithm and the backward projection algorithm described above.

In step S205, the 2D MIMO array panel is translated, and the process returns to the step S201 to perform scanning detection at a new position. The 2D MIMO array panel may be translated according to a preset path. For example, as shown in FIG. 10, the 2D MIMO array panel is translated by one step each time, until it is translated to the last position on the path.

In some embodiments, step S206 to step 207 may be further executed subsequent to the step S204.

In step S206, the reconstructed image of the inspected object is analyzed to determine whether the inspected object contains a dangerous article. If so, step S207 is executed. If not, the security inspection of the current inspected object is ended. For example, the reconstructed image of the inspected object may be compared with a pre-stored template. If a degree of matching with a characteristic template of a certain dangerous article is greater than a preset threshold, it is determined that the dangerous article may be contained, otherwise it is determined that the dangerous article is not contained. In some embodiments, a probability of containing the dangerous article may also be determined according to the degree of matching. For example, a higher degree of matching indicates a higher probability of containing the dangerous article, and a lower degree of matching indicates a lower probability of containing the dangerous article.

In step S207, the alarm device is controlled to issue an alarm. The alarm includes but is not limited to a screen display, an audio alarm, a vibration alarm and so on. An alarm level may also be set. For example, in a case of a low probability of containing the dangerous article, the alarm may be issued with a low volume sound or weak vibration, and in a case of a high probability of containing the dangerous article, the alarm may be issued with a high volume sound or a strong vibration.

The above describes a case that the security inspection apparatus includes one 2D MIMO array panel. However, those skilled in the art should understand that a method of controlling the security inspection apparatus including a plurality of 2D MIMO array panels (such as the security inspection apparatus including four 2D MIMO array panels as shown in FIG. 2) is similar to the above. In some embodiments, the image of the inspected object may be reconstructed by using a combination of the echo signals received by the plurality of 2D MIMO array panels. In some embodiments, it is also possible to perform analysis based on a combination of a plurality of reconstructed images corresponding to the plurality of 2D MIMO array panels (for example, images of the human feet at different viewing angles), so as to determine whether the dangerous article is contained, the type of the dangerous article, the quantity of the dangerous article, etc.

The embodiments of the disclosed technology further provide a computer-readable medium having instructions stored thereon, and the instructions, when executed by a processor, cause the processor to perform the method of controlling the security inspection apparatus described above.

The embodiments of the disclosed technology may perform an automatic security inspection on a part of the inspected object (for example, a foot of a human body) carried on the bottom plate, based on electromagnetic wave (for example, based on ultra-wideband radar technology). On the one hand, detection accuracy is high, and on the other hand, the inspected object is not required to take off shoes. In this way, a speed of the security inspection is increased, and a user experience is improved.

The embodiments of the disclosed technology support a full electronic scanning as well as a combination of electronic scanning and mechanical scanning. The full electronic scanning has the advantage of fast scanning speed, and by combining with a three-dimensional holographic algorithm based on Fast Fourier Transform (FFT), real-time imaging may be realized. The combination of electronic scanning and mechanical scanning may scan a large imaging area by using a small antenna array, which saves costs and has a simple structure.

In the embodiments of the disclosed technology, various 2D MIMO antenna arrays with different structures may be flexibly selected according to needs, and the use is flexible. The millimeter wave is used as the detection signal to penetrate the inspected object for imaging, thereby achieving a safe detection that may replace the X-ray detection. In this way, a higher detection quality and a higher safety are provided.

The embodiments of the disclosed technology may provide an automatic detection of threat by automatically analyzing the reconstructed image of the inspected object. Compared with the traditional methods, the detection efficiency is greatly increased, and a missing rate is reduced.

Those skilled in the art may understand that the embodiments described above are exemplary, and those skilled in the art may make improvements. The structures described in the various embodiments may be combined freely without conflicts in structure or principle.

After describing the preferred embodiments of the disclosed technology in detail, those skilled in the art may clearly understand that various changes and modifications may be made without departing from the scope and spirit of the appended claims, and the disclosed technology is not limited to the exemplary embodiments described in the disclosed technology.

What is claimed is:

1. A security inspection apparatus, comprising:
  a bottom plate configured to carry two parts of an inspected object;
  at least one side plate perpendicular to the bottom plate;
  at least one top plate located above the at least one side plate;
  a plurality of two-dimensional multiple-input multiple-output array panels, wherein one of the plurality of two-dimensional multiple-input multiple-output array panels is arranged on the bottom plate and parallel to the bottom plate, others of the plurality of two-dimensional multiple-input multiple-output array panels are arranged on the at least one side plate and the at least one top plate, respectively, and each of the plurality of two-dimensional multiple-input multiple-output array panels comprises:
    at least one two-dimensional multiple-input multiple-output sub-array, wherein each two-dimensional multiple-input multiple-output sub-array comprises a plurality of transmitting antennas and a plurality of receiving antennas, a midpoint of a connection line between each transmitting antenna of the plurality of transmitting antennas and a corresponding receiving antenna of the plurality of receiving antennas serves as an equivalent phase center, and the plurality of transmitting antennas and the plurality of receiving antennas are arranged such that the equivalent phase centers are arranged in a two-dimensional array,
    wherein each two-dimensional multiple-input multiple-output sub-array comprises a row of transmitting antennas arranged in a first diagonal direction and a row of receiving antennas arranged in a second diagonal direction, the row of transmitting antennas and the row of receiving antennas crossing to form a diagonal cross-shaped pattern, wherein the first diagonal direction is a direction in which a first diagonal of a peripheral virtual quadrilateral of the crossed row of transmitting antennas and row of receiving antennas extends, wherein the second diagonal direction is a direction in which a second diagonal of the peripheral virtual quadrilateral extends, and wherein the second diagonal is perpendicular to the first diagonal; and a control circuit configured to control the plurality of transmitting antennas to transmit a detection signal in a form of an electromagnetic wave to an inspected object in a preset order, and to control the plurality of receiving antennas to receive an echo signal from the inspected object;

a signal processing device connected to the plurality of two-dimensional multiple-input multiple-output array panels and configured to reconstruct an image of the inspected object according to the echo signal received;

a display device connected to the signal processing device and configured to display a reconstructed image of the inspected object; and a translation device configured to translate one of the two-dimensional multiple-input multiple-output array panels within a plane where the one of the two-dimensional multiple-input multiple-output array panel is located according to a preset path, wherein the one of the two-dimensional multiple-input multiple-output array panel is translated by one step each time until the one of the two-dimensional multiple-input multiple-output array panel is translated to a last position on the path, wherein the at least one side plate comprises a first side plate, a second side plate and a third side plate, a first detection space is formed between the first side plate and the second side plate, and a second detection space is formed between the second side plate and the third side plate, and wherein the first detection space and the second detection space respectively accommodate the two parts of the inspected object.

2. The security inspection apparatus according to claim 1, wherein the two-dimensional multiple-input multiple-output array panel that is arranged on the bottom plate is installed inside or below the bottom plate.

3. The security inspection apparatus according to claim 1, wherein a distance between adjacent transmitting antennas and/or a distance between adjacent receiving antennas in each two-dimensional multiple-input multiple-output sub-array is an integer multiple of a wavelength corresponding to one of a plurality of frequencies of the detection signal, and a distance between adjacent equivalent phase centers is half of the wavelength of the detection signal.

4. The security inspection apparatus according to claim 1, wherein the control circuit is configured to control the plurality of transmitting antennas in each two-dimensional multiple-input multiple-output sub-array to sequentially transmit the detection signal, and control the plurality of receiving antennas in each two-dimensional multiple-input multiple-output sub-array to receive the echo signal.

5. The security inspection apparatus according to claim 1, further comprising an alarm device connected to the signal processing device, wherein the signal processing device is further configured to: determine whether the inspected object contains a dangerous article, based on a preset standard according to the reconstructed image of the inspected object, and control the alarm device to issue an alarm in response to determining the inspected object contains the dangerous article.

6. The security inspection apparatus according to claim 1, wherein the detection signal is a microwave millimeter wave with a frequency in a range of 10 GHz~300 GHz.

7. The security inspection apparatus according to claim 1, wherein each of the plurality of two-dimensional multi-input multi-output array panels have a length ranging from 10 cm to 200 cm and a width ranging from 10 cm to 50 cm.

8. The security inspection apparatus according to claim 1, wherein the control circuit is configured to control all the transmitting antennas in each two-dimensional multiple-input multiple-output array panel to sequentially transmit the detection signal, and control all the receiving antennas in each two-dimensional multiple-input multiple-output array panel to receive the echo signal.

9. A method of controlling the security inspection apparatus according to claim 1, comprising:
using the two-dimensional multi-input multi-output array panels to transmit a detection signal to an inspected object and receive an echo signal from the inspected object; and
reconstructing an image of the inspected object based on the echo signal received.

10. The method according to claim 9, wherein the reconstructing an image of the inspected object comprises reconstructing the image of the inspected object based on a holographic reconstruction algorithm or a backward projection algorithm.

11. The method according to claim 9, further comprising
Controlling the plurality of transmitting antennas in each two-dimensional multiple-input multiple-output sub-array to sequentially transmit the detection signal, and control the plurality of receiving antennas in each two-dimensional multiple-input multiple-output sub-array to receive the echo signal.

12. The method according to claim 9, further comprising:
controlling all the transmitting antennas in each two-dimensional multiple-input multiple-output array panel to sequentially transmit the detection signal, and control all the receiving antennas in each two-dimensional multiple-input multiple-output array panel to receive the echo signal.

13. The method according to claim 9, further comprising:
determining whether the inspected object contains a dangerous article, based on a preset standard according to the reconstructed image of the inspected object, and
controlling an alarm device to issue an alarm in response to determining the inspected object contains the dangerous article.

14. The method according to claim 9, wherein the detection signal is a microwave millimeter wave with a frequency in a range of 10 GHz~300 GHz.

\* \* \* \* \*